US011727726B2

(12) United States Patent
Amitai

(10) Patent No.: US 11,727,726 B2
(45) Date of Patent: Aug. 15, 2023

(54) EVALUATING MOVEMENTS OF A PERSON

(71) Applicant: Kemtai Ltd., Or Yehuda (IL)

(72) Inventor: Mor Amitai, Or Yehuda (IL)

(73) Assignee: KEMTAI LTD., Or Yehuda (IL)

( * ) Notice: Subject to any disclaimer, the term of this patent is extended or adjusted under 35 U.S.C. 154(b) by 207 days.

(21) Appl. No.: 17/199,317

(22) Filed: Mar. 11, 2021

(65) Prior Publication Data

US 2022/0292280 A1    Sep. 15, 2022

(51) Int. Cl.
| | | |
|---|---|---|
| G06V 40/20 | (2022.01) | |
| G06T 7/20 | (2017.01) | |
| G06T 7/38 | (2017.01) | |
| G06V 20/40 | (2022.01) | |
| G06F 18/22 | (2023.01) | |

(52) U.S. Cl.
CPC .............. *G06V 40/20* (2022.01); *G06F 18/22* (2023.01); *G06T 7/20* (2013.01); *G06T 7/38* (2017.01); *G06V 20/40* (2022.01); *G06T 2207/10016* (2013.01); *G06T 2207/30196* (2013.01)

(58) Field of Classification Search
CPC ...... G06V 40/20; G06V 20/40; G06V 10/803; G06V 10/84; G06V 40/10; G06V 10/761; G06K 9/6215; G06T 7/20; G06T 7/38; G06T 2207/10016; G06T 2207/30196
See application file for complete search history.

(56) References Cited

U.S. PATENT DOCUMENTS

| | | | | |
|---|---|---|---|---|
| 9,620,168 | B1* | 4/2017 | Townsend | G06T 7/90 |
| 9,818,451 | B1* | 11/2017 | Tyagi | G11B 27/3081 |
| 11,151,386 | B1* | 10/2021 | Aggarwal | H04N 21/84 |
| 2010/0266166 | A1* | 10/2010 | Kawahara | G06V 10/763 |
| | | | | 382/118 |
| 2016/0360226 | A1* | 12/2016 | Fishwick | H04N 19/573 |
| 2018/0232563 | A1* | 8/2018 | Albadawi | A61B 5/0205 |
| 2019/0050996 | A1* | 2/2019 | Abdelhak | G06T 7/269 |
| 2019/0129432 | A1* | 5/2019 | Russell | G05D 1/0088 |
| 2021/0118169 | A1* | 4/2021 | Lee | G06T 11/20 |
| 2021/0312321 | A1* | 10/2021 | Deng | G06V 10/764 |

(Continued)

OTHER PUBLICATIONS

Dremeau et al, ("Probabilistic dance performance alignment by fusion of multimodal features", Institute Telecom, Telecom ParisTech, CNRS-LTCI, Paris, France, IEEE 2013, pp. 3642-2646 (Year: 2013).*

(Continued)

*Primary Examiner* — Amara Abdi
(74) *Attorney, Agent, or Firm* — Reches Patents

(57) ABSTRACT

A method, a system, and a non-transitory computer readable medium for evaluating first movements of a first person in view of movements of a second person. The method may include determining the relationships between the first frames and the second frames by a sequence alignment algorithm, the determining of the relationships is based on the inter-frame similarity scores and the multiple state-related scores; and determining at least one evaluation score of the movements of the first person, based on the relationships and the multiple inter-frame similarity scores; wherein the at least one evaluation score is indicative of a similarity between the movements of the first person and the movements of the second person.

17 Claims, 2 Drawing Sheets

(56) References Cited

U.S. PATENT DOCUMENTS

2022/0023717 A1* 1/2022 Kaku .................. G06V 10/761

OTHER PUBLICATIONS

Dremeau Angelique et al: Probabilistic dance perfonnance alignment by fusion of multimodal features, ICASSP, IEEE International Conference on Acoustics, Speech and Signal Processing—Proceedings 1999 IEEE, IEEE,May 26, 2013 (May 26, 2013), pp. 3642-3646.

* cited by examiner

EVALUATING MOVEMENTS OF A PERSON

BACKGROUND

Remote training may include viewing a video of a trainer, by a trainee and trying to mimic the movements of the trainer.

One drawback of remote training is the lack of feedback from the trainer and/or the lack of an accurate manner to evaluate the movements of the trainee.

There is a growing need to provide an efficient method for evaluating movements of a trainee.

SUMMARY

There may be provided a system, a method, and a non-transitory computer readable medium that stores instructions for evaluating movements of a person.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Figure 1:
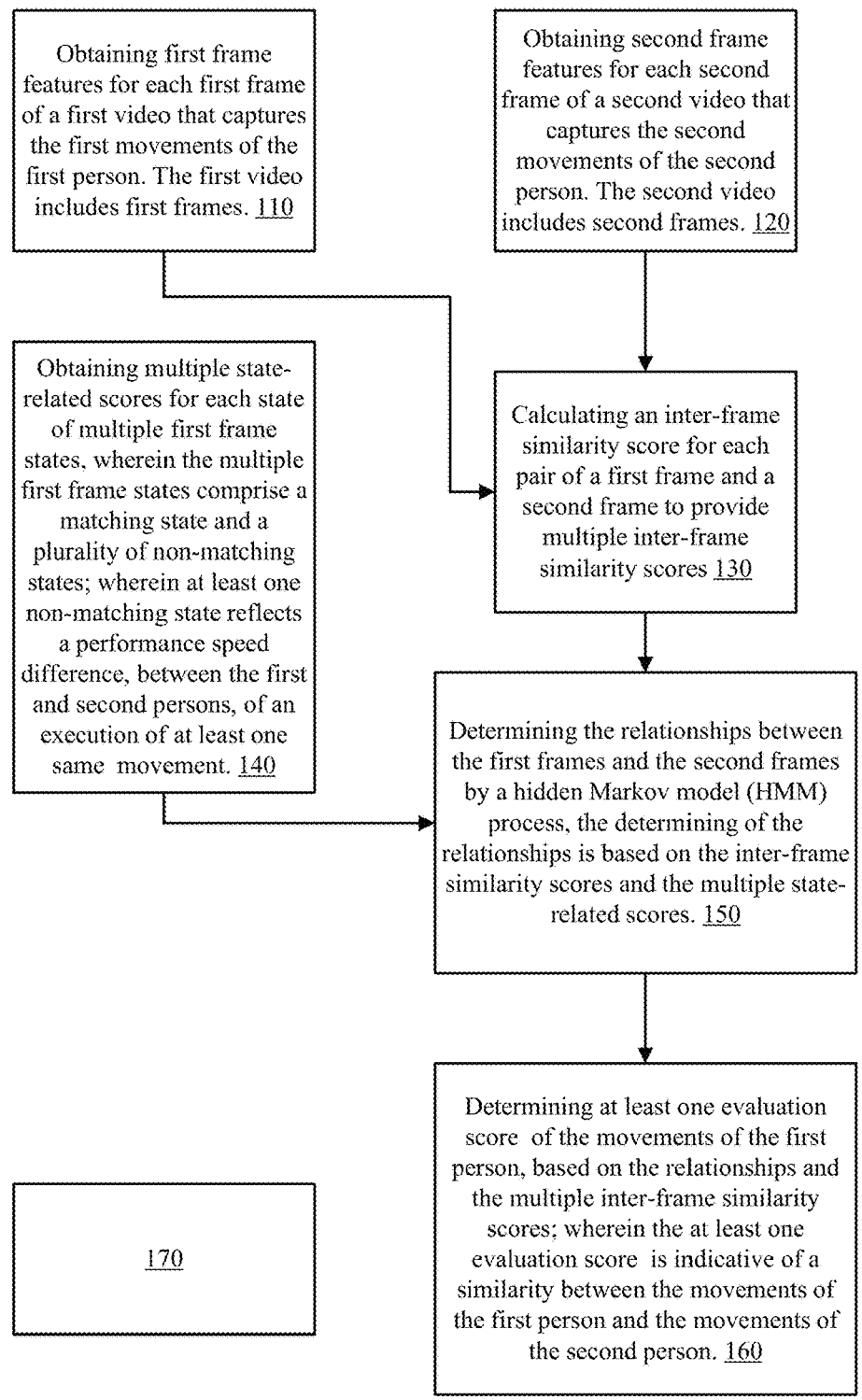
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to either one of a system, a method and a non-transitory computer readable medium should be applied mutatis mutandis to any other of the system, a method and a non-transitory computer readable medium. For example—any reference to a system should be applied mutatis mutandis to a method that can be executed by the system and to a non-transitory computer readable medium that may stores instructions executable by the system.

Because the illustrated at least one embodiment of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any number, or value illustrated below should be regarded as a non-limiting example.

The phrase "A based on B" may mean that A is solely based on B or that A is based on B and one or more other elements and/or parameters and/or information. Based on means that a calculation of A is affected by B and/or that the value of A is a function of the value of B.

The term "obtaining" may include generating, receiving, and the like.

The specification and/or drawings may refer to a processor. The processor can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a method, system and a computer readable medium for evaluating movements of a first person such as a trainee.

Any reference to a movement may be applied mutatis mutandis to a pose of a person.

The terms "first" and "second" are merely used to distinguish between an item referred to as a first item and an item referred to as a second item. Trainee and trainer are examples of a first person and a second person.

The method may include obtaining a first video and a second video.

The obtaining of any video (for example the second video) can be done using a laptop, where its screen is tilted at the angle in which the trainee image is captured (fully, or partially—including the relevant body parts), can be done with a mobile phone positioned in a similar way.

The method may be executed by any device containing commuting power, camera and screen—for example PC connect to a screen and a web cam, or a smart mirror or a dedicated device.

The second video can be streamed, the method may be executed online, close to real time, in real time (with a response time of less then a second, of a few seconds, and the like) and the method may provide immediate feedback, for example after each repetition of an exercise.

The method may be applied in various manners—it may be applicable to physical exercises, to dance, martial arts and physiotherapy. it can be users for training, dancing and practicing and doing physiotherapy and also for learning how to train, how to dance, learning martial arts techniques or how to performs the physio exercise/session.

The method may include comparing between a first video of movements of a first person and second video of a second person while taking into account various mismatches between the frames (first frames) of the first video and the frames (second frames) of the second video. The mismatches may occur due to deletion, omission and different speed of execution of movements.

There may be many (for example N1) first frames and many (N2) second frames and multiple states (for example S) per first frame. The comparing may include determining the state of each first frame—which may involve selecting a selected sequence of states out of $S^{N1}$. The number of sequences may be even larger because of potential insertions of frames of the second sequence. it can also be smaller in N2<N1 and then we cannot have N1 matches. Thus—the number of sequences may always be at least $2^{max(N1,N2)}$ because if N2 is small, the most of the first sequence states will be deletion or slow. And searching for a sequence out of so many sequences is highly inefficient and even impossible when N1 is relatively large and S exceeds 4. The suggested method is much more efficient—and uses a sequence alignment algorithm such as a hidden Markov model (HMM) process—thereby reducing the complexity to the order of N1 multiplied by N2 multiplied by S. For example—for video of few second long (for example 30 seconds)—there may be less than 1000 frames per video and the complexity is of the order of 5,000,000—which can be easily done in real time by existing processing circuits.

For simplicity of explanation various examples refer to HMM—although other sequence alignment algorithms may be used.

The real time processing allows to send feedback in real time to the first person and/or to the second person.

The HMM process is modified to take into account mismatches resulting from different speed of execution of movements. Such factors were not taken into account when using HMM in other fields such as DNA reconstructions.

The movements may be any type of movements—they may be a part of a physical exercise, physiotherapy, rehab, dance, martial art, motor skill improvement exercise, coordination improvement exercise, and the like.

The comparison can be made in real time and feedback regarding the exercise can be provided in real time—for example within less than one tenth of a second, within less than a second, within one or a few seconds, and the like.

The comparison may include determining features (referred to as meaningful features—MF) from a first video of a first person and from a second video of a second person. The MF may be determined in any manner.

The first video includes first frames and the second video includes second frames. The features of the first frames are compared to the features of the second frames—while taking into account various timing mismatches and differences between the movements of the first and second person.

Thus—each first frame may be associated with a state out of a match state and multiple non-matching states. The state of a first frame may reflect the relationship between the first frame and one or more second frame of a second video frame. The non-matching states may include at least some of a deletion, an insertion, and one or more additional non-matching states relating to differences in performance speeds of a same movement between the first person and the second person.

For example—the states of each first frame may be—matching, deletion, insertion, fast (the first person executes the movement faster than the second person), and slow (the first person executes the movement faster than the second person).

The HMM may obtain inter-frame similarity scores between each pair of first frame and second frame (this includes all possible combinations of pairs that include one first state and one second state), and scores associated with each state of the first frame and may determine the relationships between the first frames and the second frames.

The relationships may mean which first frame should be compared to which second frames, when an emission occurred, when a deletion occurred, when there is a timing difference due to execution speed difference and the like.

The scores for the non-matching states may include a score for entering a non-matching state and a score for maintaining in the state.

The method may also determine at least one evaluation score of the movements of the first person, based on the relationships and the multiple inter-frame similarity scores; wherein the at least one evaluation score is indicative of a similarity between the movements of the first person and the movements of the second person.

There may be provided at least one evaluation score per each of the features, per some of the features or per all the features. The evaluation may be calculated by the HMM or by another entity or process.

The following example refer to a first person that is a trainee and a second person that is a trainer.

There is a need to find a match between a trainer's frame sequence and a trainee's frame sequence. There is provided an MF values vector per each frame (of the trainee and the trainer) that can be derived from a skeleton algorithm applied on each frame. Examples of MF may be distances between key points of a frame of a person, Y or X value differences between points on the frame of the person, and angles defined by 3 such points. The key points may be extracted using a skeletal algorithm. The key points may correspond to different body parts such as but not limited to joints, head, arms, knees, ankles, feet, face features, and the like.

A matching score between two frames (one of the trainee and one of the trainer) will be a distance function between the two MF vectors of the pair of frames. Examples of useful distance functions are the Euclidean metric and the L1 metric. Usually both metrics should come with different weights for the different MFs (or equivalently, one can multiply the MF values by such weights) as different MF may need to be normalized as they may have different natures (eg: distances and angels) and may vary in how significant they are to the correct pose or motion.

When matching the trainer's and the trainee's frame sequences, skipping the trainer's frame ("Deletion") can be the result of two reasons: (1) the trainer performed a movement (or part of a movement) that the trainee did not do (e.g. raised the hand with the barbell higher than the trainee did, and then the lifting peak does not appear in the trainee's video) (2) The trainee performed the exercise faster than the trainer, so he has fewer frames and to match the sequences one has to skip some of the trainer's frames.

Similarly, skipping a frame of the trainee (equivalent to inserting a frame, or several frames, between a pair of adjacent frames of the trainer, "Insertion") can result from two reasons as well: (1) the trainee performed a movement (or a part of movement) that the trainer did not do (2) the trainer performed the exercise faster than the trainee.

The two different causes of deletion have different statistical characteristics as the chance of a speed difference is much greater than the chance of getting a segment of movement that was not performed by the trainee. An unperformed segment of movement will usually be longer (3-6 frames is a typical size) than a skip due to a speed difference that will usually be a single frame skip. This second type of skip is usually more abundant—often there are many, even dozens, in the same sequence.

Similarly, the two different factors for insertion also have different statistical characteristics and therefore we need a more complex modeling, with five states per frame of the trainer:

a. Match—models a match between the trainer's frame and the trainee's frame (and defines a score according to the distance between the MF vectors of the two frames).
b. Deletion—skipping the trainer's frame, because the trainee did not make a section of the movement. Here the modeling of the score is by: L*B+A. A and B may be negative and A may be much larger in its absolute value since the probability of this type of skipping is much smaller than P (length of deletion>n+1|length of deletion>n)—there is a strong dependence between skips on adjacent frames)
c. Fast—Skipping the trainer's frame because the trainee' movement is faster than the trainer's and therefore has fewer frames for the same section of the movement. Here the linear score can be L*C, under the assumption of independence between skipping adjacent frames or L*C+G without this assumption.
d. Insertion—Skipping the trainee's frame, because the trainee made a movement that the trainer did not make. Here, too, the modeling of the score is similar: L*E+D.
e. Slow—Skipping the trainee's frame because the trainee is slower than the trainer and has more frames for the same section of the movement (and the trainee's excess frames must be "inserted" between the trainer's frames). Here too the linear score is L*F (or L*F+H).

The HMM matches the vector sequences captured from the videos of the trainer and the trainee in a way that minimizes the differences between the matched vectors and while keeping the order of vectors within the two vector sequences. This matching naturally defines a matching between the frames of the trainer and trainee, defining not only the An matched frames but also the areas in the trainer's sequence that are missing in the trainee's sequence and vice versa.

The HMM determines, for each trainee frame its state—and thus can know which second frame to compare to the first frame—or whether the first frame does not have a matching second frame.

The HMM may calculate the scores of multiple "paths"—each "path" represents a sequence of states for the trainee frames—and may select, based on a selection rule, the state-related scores, and the inter-frame similarity score, a selected path—which defines the state of each one of the trainee frames.

This may be used to determine the at least one evaluation score per each of the features, per some of the features or per all the features. The states of the selected path may indicate whether to ignore a certain trainee frame, which trainer frame should be compared to a certain trainee frame, whether to penalize a certain frame due to mismatch, and the like.

FIG. 1 illustrates method 100 for evaluating first movements of a first person.

Method 100 may start by steps 110 and 120.

Step 110 may include obtaining first frame features for each first frame of a first video that captures the first movements of the first person. The first video includes first frames.

Step 110 may include at least one out of (a) capturing the first video, (b) receiving the first video, (c) calculating the first frame features, (d) receiving the first frame features.

Step 120 may include obtaining second frame features for each second frame of a second video that captures second movements of a second person. The second video may include multiple second frames.

Step 120 may include at least one out of (a) capturing the second video, (b) receiving the second video, (c) calculating the second frame features, (d) receiving the second frame features.

Steps 110 and 120 may be followed by step 130 of calculating an inter-frame similarity score for each pair of a first frame and a second frame to provide multiple inter-frame similarity scores.

Method 100 may also include step 140 of obtaining multiple state-related scores for each state of multiple first frame states, wherein the multiple first frame states comprise a matching state and a plurality of non-matching states; wherein at least one non-matching state reflects a performance speed difference, between the first and second persons, of an execution of at least one same movement.

Steps 130 and 140 may be followed by step 150 of determining the relationships between the first frames and the second frames by a hidden Markov model (HMM) process, the determining of the relationships is based on the inter-frame similarity scores and the multiple state-related scores.

Method 100 may also include step 160 of determining at least one evaluation score of the movements of the first person, based on the relationships and the multiple inter-frame similarity scores; wherein the at least one evaluation score is indicative of a similarity between the movements of the first person and the movements of the second person.

In FIG. 1 step 160 is illustrated as following step 150.

It should be noted that step 160 may be calculated during step 150 or at least in partial overlap with step 150.

Step 160 may be calculated by the HMM process or by another entity.

The at least one non-matching state may include a first non-matching state (referred also to as "fast" state) in which the performance speed of the first person exceeds the performance speed of the second person, and a second non-matching state (referred also to as "second" state) in which the performance speed of the first person is lower than the performance speed of the second person.

The at least one non-matching state further may also include deletion state and an insertion state.

The multiple state-related scores may include, per each non-matching state, a first score (for example scores A, G, D and H) for entering the non-matching state and a second score (for example scores B, C, E and F) for maintaining in the non-matching state.

The multiple state-related scores may be calculated based on training process and may represent the probability of occurrence of each state. Method 100 may include executing the training process (step 170) or receiving the outcome of the training process.

The training process may include aligning (manually, semi-automatically or in any other manner) multiple (for example hundreds of) pairs of videos of people that should ideally perform the same movements. This can be done semi-automatically by first aligning the videos by the software with initial heuristic parameters estimation and adjusting manually.

The alignment may include determining the states of the video frames and may be rule based.

The rules may be based on assumptions regarding execution speed difference that may be up to a certain factor (for example 3 times) faster or slower and that it persists for at least 3 gaps with singles matches separating them. This enables to separate between deletion state and fast state as well as between an insertion state and a slow state using the manual alignment).

A first set of rules:
a. A gap longer than 3 frames is considered to be an insertion state or deletion state (according to if the 'extra' frames are of the first video or second video).
b. A gap that is of 3 frames or less, and that there is no gap following or preceding it (e.g. another gap, one frame earlier of later) will also be considered as an insertion state or a deletion state.
c. Other gaps (not covered by rule (a) or (b) may be considered a fast state or a slow state (again according to if the 'extra' frames are of the first or second video).

A second set of rules:
a. Three or more consecutive gaps will be considered as a fast state or a slow irrespectively of their length.
b. All other gaps will be regarded as an insertion state or a deletion state.

Other rules can be used—for example combining the two mentioned above sets of rules, such as using the first set of rules for longer gaps (e.g. >5) and for shorter gaps using the second set of rules.

The state scores may be calculated based on probability of occurrence of the states and/or on the probability of entering a state and of main maintaining in the state—wherein in this case states of a pair of consecutive frames are compared to each other.

The scores may be calculated by
a. Calculate an enter deletion state probability P1, that may include calculating the ratio between the total number of frames of entering the deletion state and the total number of frames. The frames may be counted per the pairs of videos—or per a part of the multiple pairs of videos. The enter deletion state score is calculated based on the enter deletion state probability—for example A=log P1.
b. Calculate a maintain deletion state probability P2, that may include calculating the ratio between the total number of frames of maintaining the deletion state and the total number of frames in deletion states (including frames entering a deletion state). The frames may be counted per the pairs of videos—or per a part of the multiple pairs of videos. The maintain deletion state score is calculated based on the maintain deletion state probability—for example B=log P2.
c. Calculate an enter insertion state probability P3, that may include calculating the ratio between the total number of frames of entering the insertion state and the total number of frames. The frames may be counted per the pairs of videos—or per a part of the multiple pairs of videos. The enter insertion state score is calculated based on the enter insertion state probability—for example D=log P3.
d. Calculate a maintain insertion state probability P4, that may include calculating the ratio between the total number of frames of maintaining the insertion state and the total number of frames in insertion states (including frames entering an insertion state). The frames may be counted per the pairs of videos—or per a part of the multiple pairs of videos. The maintain insertion state score is calculated based on the maintain insertion state probability—for example E=log P4.
e. Calculate an enter fast state probability P5, that may include calculating the ratio between the total number of frames of entering the fast state and the total number of frames. The frames may be counted per the pairs of videos—or per a part of the multiple pairs of videos. The enter fast state score is calculated based on the enter fast state probability—for example G=log P5.
f. Calculate a maintain fast state probability P6, that may include calculating the ratio between the total number of frames of maintaining the fast state and the total number of frames in fast states (including frames entering a fast state). The frames may be counted per the pairs of videos—or per a part of the multiple pairs of videos. The maintain fast state score is calculated based on the maintain fast state probability—for example C=log P6.
g. Calculate an enter slow state probability P7, that may include calculating the ratio between the total number of frames of entering the slow state and the total number of frames. The frames may be counted per the pairs of videos—or per a part of the multiple pairs of videos. The enter slow state score is calculated based on the enter slow state probability—for example H=log P7.
h. Calculate a maintain slow state probability P8, that may include calculating the ratio between the total number of frames of maintaining the slow state and the total number of frames in slow states (including frames entering a slow state). The frames may be counted per the pairs of videos—or per a part of the multiple pairs of videos. The maintain slow state score is calculated based on the maintain slow state probability—for example F=log P8.

It should be noted that only some of the scores may be calculated in this manner and that some scores may be calculated at other manners.

For example, deletions and insertions may be combined—assigned a single score for entering insertion/deletion and a single score for maintaining the insertion/deletion state. This may provide more sampling points—which may increase the accuracy of the score assignment.

For example, slow and fast may be combined—assigned a single score for entering fast/slow and a single score for maintaining the fast/slow state. This may provide more sampling points—which may increase the accuracy of the score assignment.

The training process may proceed by translating distances between pairs of vectors of MF values (MF distance) into this probabilistic framework.

The training process may include taking all the pairs of frames (both those that are matched by the manual alignments and those which are not) and look at the distances between the pairs of vectors of MF values in each pair frames to provide match distances.

The training process may proceed by dividing non-negative real numbers into K segments such that in each segment there are equal numbers (up to +−1) of the pair distances. A typical K is 50. K can be larger if we have more manually aligned video frames.

For each segment S, the training process may calculate PNM(S)—probability of a random pair of match frames (those which are matched by the manual alignment) to fall in this segment by calculating the distances of all matched pairs of frames f1,f2, where first frame f1 is from the first video of a manually aligned pair and second frame f2 is a frame of the second video. This can be done for all of the multiple pairs of videos.

The training process follows by assigning a score for each distance D, Score(D)=−log(PNM(S(D))) where S(D) is the segment that D belongs to.

Using these scores provides that the total score of an alignment is approximately proportional to the log likelihood of this alignment, and the alignment with the highest log likelihood will be calculated with the HMM and outputted as the sequence of states.

Given one or more scores—method 100 can identify the differences between the trainees video and the trainers video and provide corrective feedback and/or scores (for example—start with a perfect score and reduce the score based on the length of the gaps, and of the MF distances between the aligned frames).

Method 100 may also play the aligned videos (for example side by side) and show to the user the differences in performance. For example a deletion can be because the trainer lifted his arm higher than the user (hence the highest part of the movement appears only in the trainer's video and not in the user's).

Figure 2:
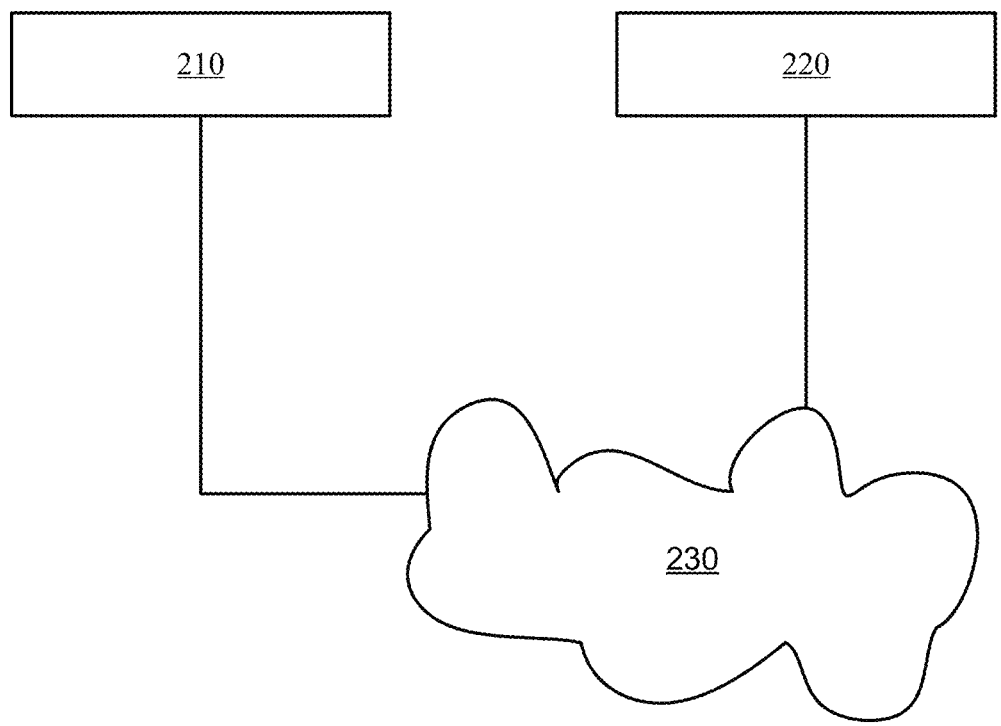
FIG. 2 illustrates an example of various devices.

FIG. 2 illustrates a user device 210 such as a user computer (may be a mobile computer, a smartphone, a desktop, a smart mirror, a special purpose device, and the like), and a second device 220 that may communicate with the user device via one or more networks 230. The one or more networks may be any type of networks—wired, wireless, local network, wide area network, the Internal, and the like.

The second device 220 may be a computerized system such as data center, a remote server, a cloud computer, and the like. The second device 220 may provide to the user device the second video, features of the second video, the scores for the HMM, may receive the first video from the under device, may receive features of the first videos and the like.

Method 100 may be executed solely by the user device 210, solely by the second device 220, may be executed in part by the user device 210 and also in part by the second device 220.

Each one of the first device and second device may include a processor that may include one or more processing circuits, and a memory for storing at least some of the videos, video frames, video frame features, any of the scores mentioned in the application, distances, instructions and/or or code and/or software for executing one or more part of method 100, and the like.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation; a single operation may be distributed in additional operations and operations may be executed at least partially overlapping in time. Moreover, alternative embodiments may include multiple instances of an operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The terms "including", "comprising", "having", "consisting" and "consisting essentially of" can be replaced with each other. For example—any method may include at least the steps included in the figures and/or in the specification, only the steps included in the figures and/or the specification.

I claim:

1. A method for evaluating first movements of a first person in view of movements of a second person, the method comprises:

obtaining first frame features for each first frame of a first video that captures movements of the first person; the first video comprises multiple first frames;

obtaining second frame features for each second frame of a second video that captures movements of the second person; the second video comprises multiple second frames;

calculating an inter-frame similarity score for each pair of a first frame and a second frame to provide multiple inter-frame similarity scores;

obtaining multiple state-related scores for each state of multiple first frame states, wherein the multiple first frame states comprise a matching state and a plurality of non-matching states; wherein at least one non-matching state reflects a performance speed difference, between the first and second persons, of an execution of at least one same movement;

determining a relationship between the first frames and the second frames by a sequence alignment algorithm, the determining of the relationships is based on the inter-frame similarity scores and the multiple state-related scores; and determining at least one evaluation score of the movements of the first person, based on the relationships and the multiple inter-frame similarity scores; wherein the at least one evaluation score is indicative of a similarity between the movements of the first person and the movements of the second person.

2. The method according to claim 1 wherein the determining of the at least one evaluation score is executed by the sequence alignment algorithm.

3. The method according to claim 1 wherein the determining of the at least one evaluation score is executed by the sequence alignment algorithm.

4. The method according to claim 1 wherein the determining of the relationships is included is preceded by determining a state of each first frame.

5. The method according to claim 1 wherein the at least one non-matching state comprises a first non-matching state in which the performance speed of the first person exceeds the performance speed of the second person, and a second non-matching state in which the performance speed of the first person is lower than the performance speed of the second person.

6. The method according to claim 5 wherein the at least one non-matching state further comprises a missing state and an insertion state.

7. The method according to claim 6 wherein the multiple state-related scores comprise, per each non-matching state, a first score for entering the non-matching state and a second score for maintaining in the non-matching state.

8. The method according to claim 7 wherein the multiple state-related scores are calculated based on training process.

9. The method according to claim 8 wherein the training process comprises performing a rule based determination of states and calculating the multiple state-related scores to reflect occurrences of entering non-matching states and occurrences of maintaining in the non-matching states.

10. The method according to claim 1 wherein the first frame features comprise distances between points of a frame of the first person, angles defined by triplets of points of the frame of the first person.

11. The method according to claim 1 wherein the obtaining of the first frame features comprises capturing the first video and calculating the first frame features.

12. The method according to claim 1 comprising providing feedback in real time to the first person, wherein the feedback is based on the similarity score.

13. The method according to claim 1 comprising aligning the first frame with the second frame based on the providing feedback in real time to the first person, wherein the feedback is based on the similarity score.

14. The method according to claim 1 wherein the sequence alignment algorithm is a Markov model (HMM) algorithm.

15. A method for evaluating first movements of a first person in view of movements of the second person, the method comprises:
obtaining first frame features for each first frame of a first video that captures movements of the first person; the first video comprises multiple first frames;
obtaining second frame features for each second frame of a second video that captures movements of a second person; the second video comprises multiple second frames;
calculating an inter-frame similarity score for each pair of a first frame and a second frame to provide multiple inter-frame similarity scores;
obtaining multiple state-related scores for each state of multiple first frame states, wherein the multiple first frame states comprise a matching state and a plurality of non-matching states; wherein at least one non-matching state reflects a performance speed difference, between the first and second persons, of an execution of at least one same movement;
determining a relationship between the first frames and the second frames by a sequence alignment algorithm, the determining of the relationships is based on the inter-frame similarity scores and the multiple state-related scores; and
determining at least one evaluation score of the movements of the first person, based on the relationships and the multiple inter-frame similarity scores; wherein the at least one evaluation score is indicative of a similarity between the movements of the first person and the movements of the second person.

16. A non-transitory computer readable medium for evaluating first movements of a first person in view of movements of the second person, the non-transitory computer readable medium that stores instructions for:
obtaining first frame features for each first frame of a first video that captures movements of the first person; the first video comprises multiple first frames;
obtaining second frame features for each second frame of a second video that captures movements of a second person; the second video comprises multiple second frames;
calculating an inter-frame similarity score for each pair of a first frame and a second frame to provide multiple inter-frame similarity scores;
obtaining multiple state-related scores for each state of multiple first frame states, wherein the multiple first frame states comprise a matching state and a plurality of non-matching states; wherein at least one non-matching state reflects a performance speed difference, between the first and second persons, of an execution of at least one same movement;
determining a relationship between the first frames and the second frames by a sequence alignment algorithm, the determining of the relationships is based on the inter-frame similarity scores and the multiple state-related scores; and
determining at least one evaluation score of the movements of the first person, based on the relationships and the multiple inter-frame similarity scores; wherein the at least one evaluation score is indicative of a similarity between the movements of the first person and the movements of the second person.

17. The non-transitory computer readable medium according to claim 16 wherein the sequence alignment algorithm is a Markov model (HMM) algorithm.

* * * * *